(12) United States Patent
Attibele et al.

(10) Patent No.: US 12,459,569 B2
(45) Date of Patent: Nov. 4, 2025

(54) TANK STEER SYSTEM FOR VEHICLE

(71) Applicant: FCA US LLC, Auburn Hills, MI (US)

(72) Inventors: Pradeep R Attibele, Ann Arbor, MI (US); Sandeep Makam, Rochester Hills, MI (US); Mark A Levine, White Lake, MI (US); Raffaele Fregonese, Monteu Roero (IT); Robert S Smyczynski, Clarkston, MI (US)

(73) Assignee: FCA US LLC

( * ) Notice: Subject to any disclaimer, the term of this patent is extended or adjusted under 35 U.S.C. 154(b) by 479 days.

(21) Appl. No.: 18/158,143

(22) Filed: Jan. 23, 2023

(65) Prior Publication Data
US 2024/0246607 A1 Jul. 25, 2024

(51) Int. Cl.
| | |
|---|---|
| *B62D 11/10* | (2006.01) |
| *B60K 17/02* | (2006.01) |
| *B60K 17/16* | (2006.01) |
| *B60K 17/354* | (2006.01) |
| *F16H 37/08* | (2006.01) |
| *F16H 48/08* | (2006.01) |
| *B60K 1/00* | (2006.01) |
| *B60K 17/356* | (2006.01) |
| *F16H 48/24* | (2006.01) |
| *F16H 61/00* | (2006.01) |

(52) U.S. Cl.
CPC .............. *B62D 11/10* (2013.01); *B60K 17/02* (2013.01); *B60K 17/165* (2013.01); *B60K 17/354* (2013.01); *F16H 37/082* (2013.01); *F16H 48/08* (2013.01); *B60K 2001/001* (2013.01); *B60K 17/356* (2013.01); *F16H 48/24* (2013.01); *F16H 61/0059* (2013.01)

(58) Field of Classification Search
CPC ......... B62D 11/06; B62D 11/08; B62D 11/10; B62D 11/12; B60K 17/02; B60K 17/165; B60K 17/354; B60K 17/356; B60K 2001/001; F16H 37/082; F16H 48/08; F16H 48/24; F16H 61/0059
See application file for complete search history.

(56) References Cited

U.S. PATENT DOCUMENTS

| | | | | |
|---|---|---|---|---|
| 3,994,375 | A * | 11/1976 | Stritzel | B60T 1/062 188/73.31 |
| 6,293,890 | B1 * | 9/2001 | Kaku | F16H 48/08 475/230 |
| 6,953,408 | B2 | 10/2005 | Thompson | |

(Continued)

*Primary Examiner* — Timothy Hannon
(74) *Attorney, Agent, or Firm* — Jeremy J. Klobucar

(57) ABSTRACT

A vehicle configured to perform a tank steer operation includes a differential having a differential case, first and second half shafts operably coupled to the differential, a drive unit configured to drive the vehicle, and a gearbox assembly coupled to the drive unit. The vehicle is selectively operable in a tank steer mode that rotates one or more wheels on a first side of the vehicle in a first direction, and rotates one or more wheels on an opposite second side of the vehicle in a second direction opposite the first direction to rotate the vehicle. The vehicle operates in the tank steer mode by selectively grounding the differential case and connecting an output of the gearbox assembly to the first half shaft, such that the drive unit rotates the first half shaft in the first direction and, via the differential, rotates the second half shaft in the second direction.

18 Claims, 4 Drawing Sheets

(56) References Cited

U.S. PATENT DOCUMENTS

| | | |
|---|---|---|
| 7,294,082 B2 | 11/2007 | Lim et al. |
| 8,844,665 B2 | 9/2014 | Wenger et al. |
| 10,132,394 B2 * | 11/2018 | Genise .................. B60K 17/16 |
| 2007/0068710 A1 | 3/2007 | Witzenberger et al. |
| 2021/0276409 A1 * | 9/2021 | Devreese ............... B60K 17/06 |

* cited by examiner

TANK STEER SYSTEM FOR VEHICLE

FIELD

The present application relates generally to vehicles and, more particularly, to systems and methods for performing a tank steer operation in a vehicle.

BACKGROUND

A vehicle is typically limited by the turning circle of the steering system while the vehicle is rolling. In some off-road maneuvers, it is desirable for the vehicle to have a tighter turning radius than what is available on a stock vehicle, for example, if an obstacle prevents the vehicle from moving in a forward direction. In order to provide tighter turning, some electric vehicles can achieve a "tank steer" in order to help the vehicle make sharper turns by driving each wheel with an independent motor. However, such systems are expensive as they require four electric machines, four power inverters, and associated high voltage cables and components. Accordingly, while such systems work well for their intended purpose, there is a desire for improvement in the relevant art.

SUMMARY

In accordance with one example aspect of the invention, a vehicle configured to perform a tank steer operation is provided. The vehicle includes a differential having a differential case, first and second half shafts operably coupled to the differential, a drive unit configured to drive the vehicle, and a gearbox assembly coupled to the drive unit. The vehicle is selectively operable in a tank steer mode that rotates one or more wheels on a first side of the vehicle in a first direction, and rotates one or more wheels on an opposite second side of the vehicle in a second direction opposite the first direction to thereby rotate the vehicle. The vehicle operates in the tank steer mode by selectively grounding the differential case and connecting an output of the gearbox assembly to the first half shaft, such that the drive unit rotates the first half shaft in the first direction and, via the differential, rotates the second half shaft in the opposite second direction.

In addition the foregoing, the described vehicle may include one or more of the following features: wherein in the tank steer mode, the differential case is grounded to an axle case; a low ratio unit, wherein in the tank steer mode, the differential case is grounded by connecting the differential case to the low ratio unit; wherein the low ratio unit is a planetary gear set; and wherein a ring gear of the planetary gear set is grounded.

In addition the foregoing, the described vehicle may include one or more of the following features: a set of selectable connectors, including, a first connector coupled to the output of the gearbox assembly, a second connector coupled to the first half shaft, a third connector coupled to the differential case, and a fourth connector coupled to the low ratio unit, wherein in the tank steer mode, the first connector is coupled to the second connector, and the third connector is coupled to the fourth connector; wherein each connector of the set of selectable connectors is a spline or dog clutch; wherein in a drive mode, the first connector is coupled to the third connector; wherein in a low mode, the first connector is coupled to the fourth connector; and wherein in a vehicle park mode, the first, second, and fourth connectors are coupled simultaneously.

In addition the foregoing, the described vehicle may include one or more of the following features: a steering wheel in signal communication with a controller, wherein in the tank steer mode the controller performs a tank steer operation in a direction based at least in part on a left or right orientation of the steering wheel; wherein only a single drive unit drives the first and second half shafts in the tank steer mode; wherein the drive unit is an electric traction motor; wherein the differential is an open differential; and a second differential having a second differential case, third and fourth half shafts operably coupled to the second differential, a second drive unit, and a second gearbox assembly coupled to the second drive unit, wherein the vehicle further operates in the tank steer mode by selectively grounding the second differential case and connecting an output of the second gearbox assembly to the third half shaft, such that the second drive unit rotates the third half shaft in the first direction and, via the second differential, rotates the fourth half shaft in the opposite second direction.

In accordance with another example aspect of the invention, a method of performing a vehicle tank steer operation on a vehicle having a plurality of wheels, a differential having a differential case, first and second half shafts operably coupled to the differential, a drive unit configured to drive the vehicle, and a gearbox assembly coupled to the drive unit, is provided. In one example, the method includes: receiving, at a controller, a request for a tank steer mode, initiating the tank steer mode by grounding the differential case and connecting an output of the gearbox assembly to the first half shaft, and actuating the drive unit to rotate the first half shaft in a first direction and, via the differential, rotate the second half shaft in a second direction opposite the first direction.

In addition the foregoing, the described method may include one or more of the following features: wherein the vehicle further includes a low ratio unit and a set of selectable connectors, including (i) a first connector coupled to the output of the gearbox assembly, (ii) a second connector coupled to the first half shaft, (iii) a third connector coupled to the differential case, and (iv) a fourth connector coupled to the low ratio unit, the method further including when initiating the tank steer mode, coupling the first connector to the second connector, and coupling the third connector to the fourth connector; and wherein the differential is an open differential, the low ratio unit is a planetary gear set, and the drive unit is an electric traction motor.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

According to the principles of the present application, systems and methods are described for performing a vehicle tank steer operation. In the example embodiments, a tank steer system is configured to enable the vehicle to rotate the wheels on one axle in opposite directions at zero vehicle speed, thereby enabling the vehicle to make very tight turns. While some level of functionality may be achieved by having tank steer on a single axle, higher functionality may be achieved by having the tank steer system installed on two or more axles. Thus, the system is configured to turn the wheels on one side of the vehicle in one direction (e.g., forward), while the wheels on the other side of the vehicle turn in the opposite direction (e.g., rearward), thereby rotating the vehicle around a center point.

In the example embodiments, the tank steer system includes a reduction gear box (e.g., single or multi-speed) driven by a propulsion unit (e.g., electric motor), a set of selectable splines/dog clutches, and a low ratio unit operably associated with a differential. The tank steer system provides a tank steer mode as well as drive, low, and park modes. When shifting to tank steer mode, one dog clutch disengages the drive from the differential housing and connects the drive to one of the half shafts while the other dog clutch grounds the differential housing to the axle case or low ratio unit, thereby providing a reaction for equal and opposite half shaft rotation.

Figure 1:
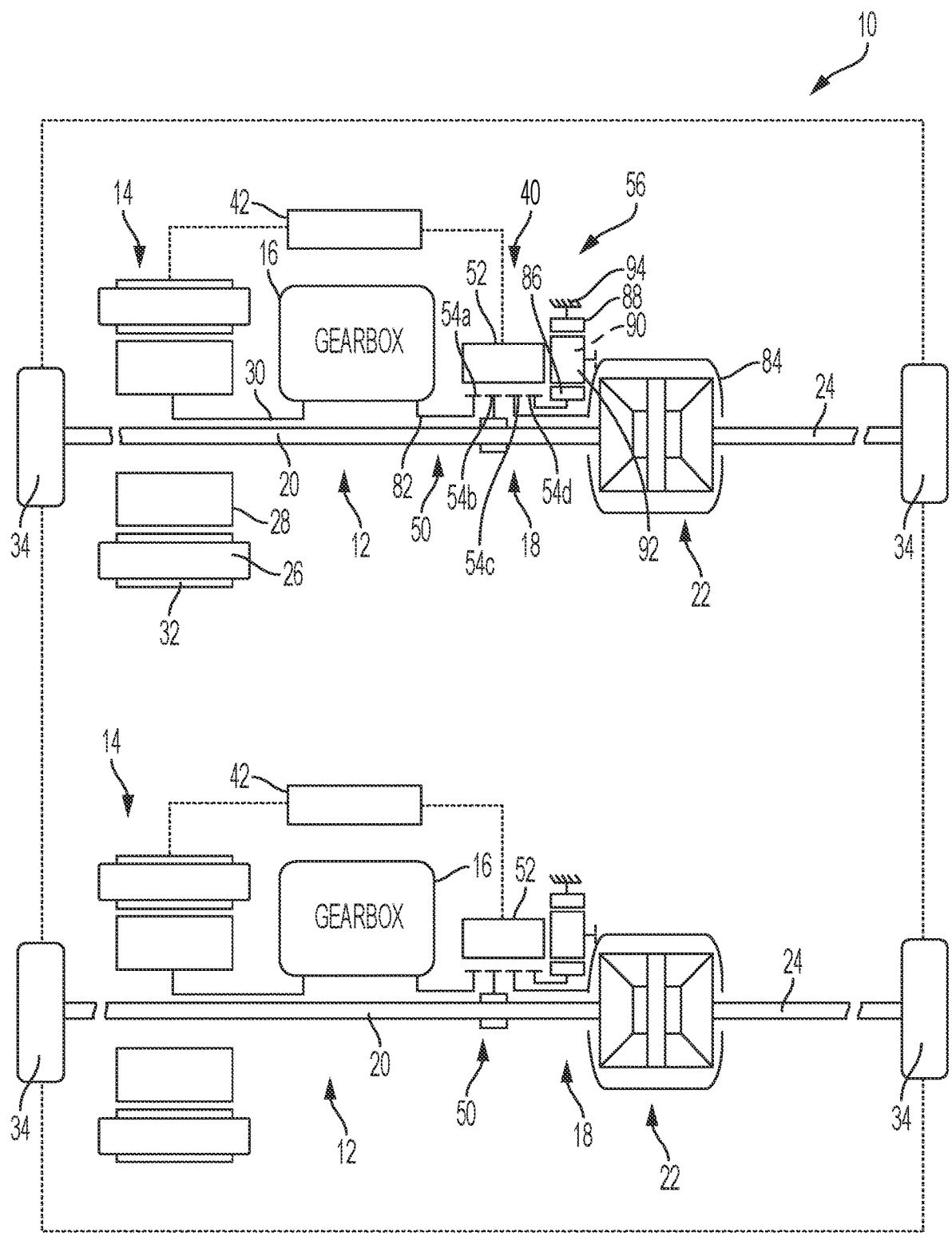
FIG. 1 is a schematic illustration of an example vehicle drivetrain in accordance with the principles of the present application.

With initial reference to FIG. 1, a vehicle 10 in accordance with the principles of the present disclosure is illustrated. In the example embodiment, vehicle 10 includes a propulsion system 12 that generally includes one or more drive units or motors 14 (e.g., electric traction motors) and a reduction gearbox assembly 16. The electric motor(s) 14 are selectively connectable to a high voltage battery system (not shown) for powering the electric motor(s) 14, and the gearbox assembly 16 is configured to transfer the generated drive torque to a driveline 18, including a first or left axle shaft 20, a differential 22, and a second or right axle shaft 24. In the example embodiment, each electric motor 14 generally includes a stator 26, a rotor 28, and a rotor shaft 30. The stator 26 is fixed (e.g., to a housing 32) and the rotor 28 is configured to rotate relative to the stator 26 to drive the rotor shaft 30 and thus the vehicle axles 20, 24 (e.g., half shafts) and wheels 34. As shown, vehicle 10 includes a single drive unit 14 for each pair of axles 20, 24, though in some configurations, vehicle 10 may only include one drive unit in total.

In the example embodiment, vehicle 10 further includes a tank steer system 40 having a controller 42 configured to enable vehicle 10 to perform one or more tank steer movements by driving one or more wheels 34 on the left side of the vehicle 10 in a direction opposite one or more wheels 34 on the right side of the vehicle 10. In the example embodiment, tank steer system 40 generally includes electric motor 14, gearbox assembly 16, a selectable connector assembly 50 including an actuator 52 to selectively translate/operate a set of selectable connectors or splines/dog clutches 54a-54d, a low ratio unit 56, and differential 22. One tank steer system 40 may be utilized for each pair of axles 20, 24.

Figure 2:
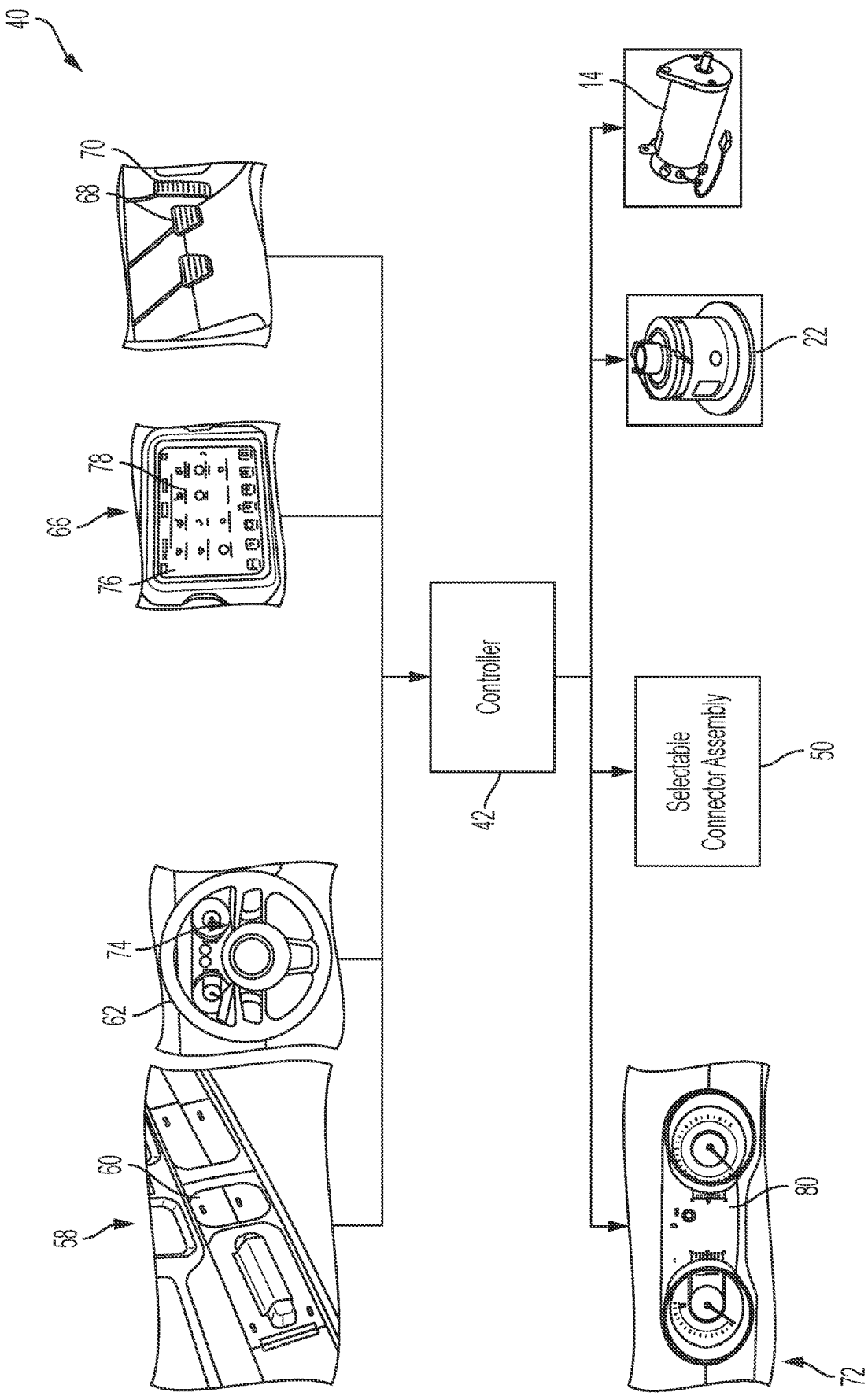
FIG. 2 is a schematic diagram of an example tank steer system of the vehicle shown in FIG. 1, in accordance with the principles of the present application.

With additional reference to FIG. 2, controller 42 is in signal communication with a plurality of vehicle systems/components including: an instrument panel 58 having a tank steer mode switch 60, a steering wheel 62, a display 66, a brake pedal 68, and an accelerator pedal 70. Controller 42 is also in signal communication with an instrument panel cluster 72, the selectable connector assembly 50, rear and/or front differentials 22, and electric motor 14.

In the example embodiment, tank steer mode switch 60 is configured to switch vehicle 10 between a normal "drive mode" and a "tank steer mode." Switch 60 (or another switch) may also switch vehicle 10 into a "low mode" and/or a "park mode," as described herein in more detail. In one example implementation, the tank steer mode switch 60 must first be activated before tank steer system 40 can be activated. The steering wheel 62 is configured to control the direction of the tank steer operation by orienting the steering wheel 62 in the direction of the desired tank steer turn before initiation thereof. In some examples, steering wheel 62 additionally includes one or more input switches 74 (e.g., buttons, paddle shifters) utilized to activate and/or control the tank steer operation.

In the example embodiment, the tank steer operation can be initiated and performed automatically or manually. For automatic operation, display 66 includes a user interface or touch screen 76 configured to display a soft button 78 for a user to automatically activate a tank steer mode (as opposed to manual operation). Soft button 78 enables the user to direct the controller 42 to automatically tank steer the vehicle 10 to a desired direction or heading (e.g., rotate 45°), and subsequently automatically enter the tank steer mode and perform the tank steer operation.

If manual control of the tank steer is desired, the driver can utilize the brake pedal 68 and accelerator pedal 70 as inputs to control the tank steer. For example, when the accelerator pedal 70 is pressed, the vehicle 10 is tank steered (e.g., rotated) in the desired direction (left or right), for example, based on a position of steering wheel 62. Pressing the brake pedal 68 subsequently brakes the wheels 34 and prevents further tank steer rotation. Additionally, the instrument panel cluster 72 includes a display 80 configured to display a status and/or diagnostic message from the tank steer system 40.

Figure 3:
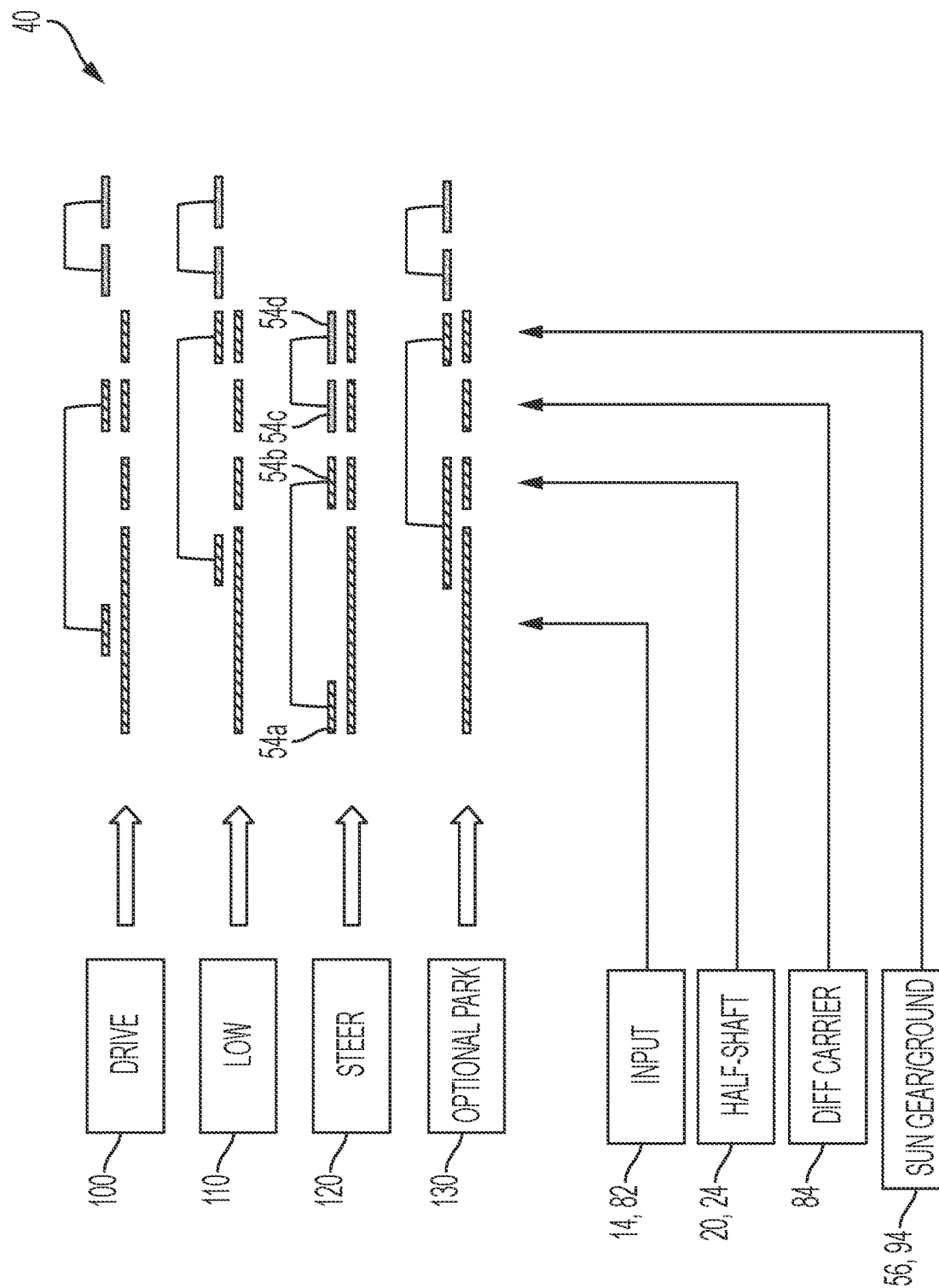
FIG. 3 is a schematic illustration of example engagement modes of the tank steer system shown in FIGS. 1 and 2, in accordance with the principles of the present application.

With additional reference now to FIGS. 1 and 3, in the example embodiment, the tank steer system 40 utilizes controller 42 to control actuator 52 to selectively engage the splines/dog clutches 54a-54d (e.g., a sliding set of internal splines) to thereby switch the vehicle between the drive mode 100, the low mode 110, the tank steer mode 120, and the park mode 130. As illustrated, the first spline/dog clutch 54a is connected to an output shaft 82 of the gearbox assembly 16, and the second spline/dog clutch 54b is connected to one of the half shafts 20, 24. The third spline/dog clutch 54c is connected to a differential case 84, and the fourth spline/dog clutch 54d is connected to the low ratio unit 56. In alternative configurations, the low ratio unit 56 is not present, and the fourth spline/dog clutch 54d is grounded, for example, to the axle case.

In the example embodiment, low ratio unit 56 is a planetary gear set generally having a sun gear 86, a ring gear 88, planet gears 90, and a planetary carrier 92. The sun gear 86 is connected to the fourth spline/dog clutch 54d, the ring gear 88 is rigidly connected to ground 94 (e.g., an axle case), and the planetary carrier 92 is connected to the differential case 84. When the input splines are driven via the sun gear, the planetary gear set achieves a ratio reduction by reacting off the ground 94 via ring gear 88 and providing the torque multiplied output to the differential case 84. If the input splines are not connected to a set of driving splines, the planetary gear set rotates freely, with the planetary carrier 92 rotating at the same speed as the differential case 84. However, it will be appreciated low ratio unit 56 may have any suitable configuration that enables tank steer system 40 to function as described herein.

With continued reference to FIGS. 1 and 3, the operational modes provided by the tank steer system 40 will be described in more detail. In the Drive Mode 100, the first spline/dog clutch 54a is connected to the third spline/dog clutch 54c such that the gear box assembly output shaft 82 is connected to the differential case 84. This causes the differential case 84 to be driven by the gear assembly output shaft 82. In the Low Mode 110, the first spline/dog clutch 54a is connected to the fourth spline/dog clutch 54d such that the gear box assembly output shaft 82 is connected to the sun gear 86. This causes the differential case 84 to be driven by the planetary carrier 92 after achieving torque multiplication. In the optional Park Mode 130, the first spline/dog clutch 54a and the second spline/dog clutch 54b are connected to the fourth spline/dog clutch 54d such that gear box assembly output shaft 82 and half shaft 20 are engaged with the sun gear 86. Alternatively, only the second spline/dog clutch 54b is connected to the fourth spline/dog clutch 54d. This causes a lock between the axle half shaft 20 and the differential case 84.

In the Tank Steer Mode 120, the first spline/dog clutch 54a is connected to the second spline/dog clutch 54b on the axle half shaft 20. At the same time, the third spline/dog clutch 54c is connected to the fourth spline/dog clutch 54d such that the differential case 84 and the sun gear 86 are engaged. This engagement of the differential case 84 and sun gear 86 prevents rotation of the differential case 84. Since the differential case 84 is a two degree of freedom system, when the differential case 84 is locked, the two half shafts 20, 24 can rotate in opposite directions. By connecting the gearbox assembly output shaft 82 (dog clutch 54a) to the half shaft 20 (dog clutch 54b), the first half shaft 20 can be driven by the gearbox assembly 16, which causes the second half shaft 24 to rotate in the opposite direction, thereby providing the tank steer functionality. Moreover, with the gearbox assembly 16 being driven by the electric motor 14, the direction of rotation can be easily reversed, without the need for a reverse gear, thereby enabling tank steer in either direction.

Figure 4:
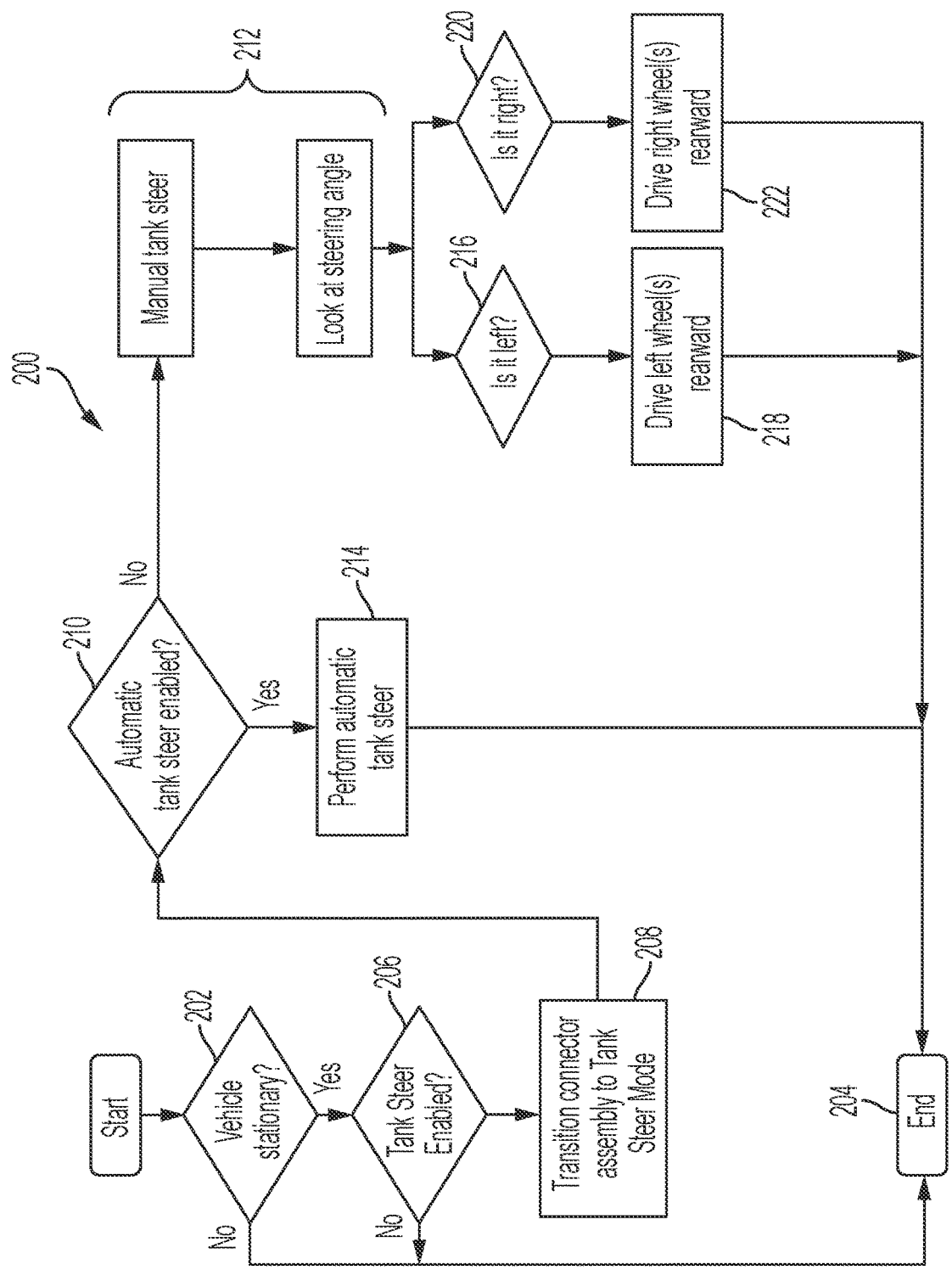
FIG. 4 is a flow control diagram of one example operation of the tank steer system, in accordance with the principles of the present application.

FIG. 4 illustrates one example method 200 of operating tank steer system 40 to perform a tank steer operation when the engine 14 is on, the driver is present, and the vehicle 10 is in gear. In the example embodiment, the method begins at step 202 and controller 42 determines if vehicle 10 is stationary. If no, control proceeds to step 204 and the operation ends. If yes, control proceeds to step 206 and controller 42 determines if tank steer is enabled via selection of the tank steer mode switch 60. If no, control proceeds to step 204. If yes, control proceeds to step 208.

In the example embodiment, at step 208, controller 42 transitions the tank steer system 40 into the Tank Steer Mode such that the first spline/dog clutch 54a is connected to the second spline/dog clutch 54b on the axle half shaft 20, and the third spline/dog clutch 54c is connected to the fourth spline/dog clutch 54d such that the differential case 84 and the sun gear 86 are engaged.

At step 210, controller 42 determines if automatic tank steer is enabled, for example, via a button, switch, touch screen 76, etc. If no, control proceeds to step 212 for manual tank steer using brake/accelerator pedals 68, 70. If yes, control proceeds to step 214 for automatic tank steer movement. At step 212, controller 42 determines a steering wheel angle of steering wheel 62. If the steering angle is leftward of a center or zero position, control proceeds to step 216 and, at step 218, when the driver presses accelerator pedal 70, controller 42 operates electric motor(s) to drive axle shaft(s) 20 and wheel(s) 34 on the left hand side of vehicle 10 in a rearward direction. Because of the nature of how an open differential works, the wheel(s) 34 on the right hand side of vehicle 10 rotate in the opposite forward direction. By grounding the differential case 84 to the low ratio unit 56 and switching the drive input to a single half shaft 20, the system 40 takes advantage of the open differential principle and can achieve tank steer with only one motor per axle.

If steering angle is rightward of center or zero position, control proceeds to step 220 and, at step 222, when the driver presses accelerator pedal 70, controller 42 operates electric motor(s) to drive axle shaft(s) 20 and wheel(s) 34 on the left hand side of vehicle 10 in a forward direction. Because of the nature of how an open differential works, the wheel(s) 34 on the right hand side of vehicle 10 rotate in the opposite rearward direction.

Described herein are systems and methods for performing a vehicle tank steer operation. The system includes a single drive unit (e.g., electric motor) on each axle with selectively actuated dog clutches internal to the axle. During tank steer operation, one dog clutch disengages the drive from the differential housing and connects the drive to one of the half shafts, while the other dog clutch grounds the differential carrier (e.g., to a low ratio unit). Due to the open differential, rotation of the one half shaft causes reverse rotation of the other half shaft, thereby achieving tank steer. Utilizing a single drive unit for each axle improves packaging and reduces cost.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A vehicle configured to perform a tank steer operation, comprising:
   a differential having a differential case;
   first and second half shafts operably coupled to the differential;
   a drive unit configured to drive the vehicle; and
   a gearbox assembly coupled to the drive unit;
   wherein the vehicle is selectively operable in a tank steer mode that rotates one or more wheels on a first side of the vehicle in a first direction, and rotates one or more wheels on an opposite second side of the vehicle in a second direction opposite the first direction to thereby rotate the vehicle,
wherein the vehicle operates in the tank steer mode by selectively grounding the differential case and connecting an output of the gearbox assembly to the first half shaft, such that the drive unit rotates the first half shaft in the first direction and, via the differential, rotates the second half shaft in the opposite second direction.

2. The vehicle of claim 1, wherein in the tank steer mode, the differential case is grounded to an axle case.

3. The vehicle of claim 1, further comprising a low ratio unit, wherein in the tank steer mode, the differential case is grounded by connecting the differential case to the low ratio unit.

4. The vehicle of claim 3, wherein the low ratio unit is a planetary gear set.

5. The vehicle of claim 4, wherein a ring gear of the planetary gear set is grounded.

6. The vehicle of claim 1, further comprising a set of selectable connectors, including:
a first connector coupled to the output of the gearbox assembly;
a second connector coupled to the first half shaft;
a third connector coupled to the differential case; and
a fourth connector coupled to the low ratio unit,
wherein in the tank steer mode, the first connector is coupled to the second connector, and the third connector is coupled to the fourth connector.

7. The vehicle of claim 6, wherein each connector of the set of selectable connectors is a spline or dog clutch.

8. The vehicle of claim 6, wherein in a drive mode, the first connector is coupled to the third connector.

9. The vehicle of claim 6, wherein in a low mode, the first connector is coupled to the fourth connector.

10. The vehicle of claim 6, wherein in a vehicle park mode, the first, second, and fourth connectors are coupled simultaneously.

11. The vehicle of claim 1, further comprising a steering wheel in signal communication with a controller, wherein in the tank steer mode the controller performs a tank steer operation in a direction based at least in part on a left or right orientation of the steering wheel.

12. The vehicle of claim 1, wherein only a single drive unit drives the first and second half shafts in the tank steer mode.

13. The vehicle of claim 1, wherein the drive unit is an electric traction motor.

14. The vehicle of claim 1, wherein the differential is an open differential.

15. The vehicle of claim 1, further comprising:
a second differential having a second differential case;
third and fourth half shafts operably coupled to the second differential;
a second drive unit; and
a second gearbox assembly coupled to the second drive unit,
wherein the vehicle further operates in the tank steer mode by selectively grounding the second differential case and connecting an output of the second gearbox assembly to the third half shaft, such that the second drive unit rotates the third half shaft in the first direction and, via the second differential, rotates the fourth half shaft in the opposite second direction.

16. A method of performing a vehicle tank steer operation on a vehicle having a plurality of wheels, a differential having a differential case, first and second half shafts operably coupled to the differential, a drive unit configured to drive the vehicle, and a gearbox assembly coupled to the drive unit, the method comprising:
receiving, at a controller, a request for a tank steer mode;
initiating the tank steer mode by grounding the differential case and connecting an output of the gearbox assembly to the first half shaft; and
actuating the drive unit to rotate the first half shaft in a first direction and, via the differential, rotate the second half shaft in a second direction opposite the first direction.

17. The method of claim 16, wherein the vehicle further includes a low ratio unit and a set of selectable connectors, including (i) a first connector coupled to the output of the gearbox assembly, (ii) a second connector coupled to the first half shaft, (iii) a third connector coupled to the differential case, and (iv) a fourth connector coupled to the low ratio unit, the method further comprising:
when initiating the tank steer mode, coupling the first connector to the second connector, and coupling the third connector to the fourth connector.

18. The method of claim 17, wherein the differential is an open differential, the low ratio unit is a planetary gear set, and the drive unit is an electric traction motor.

\* \* \* \* \*